Oct. 29, 1946.   G. M. MAGRUM   2,410,176
SHOCK ABSORBER
Filed Oct. 7, 1943   3 Sheets-Sheet 1
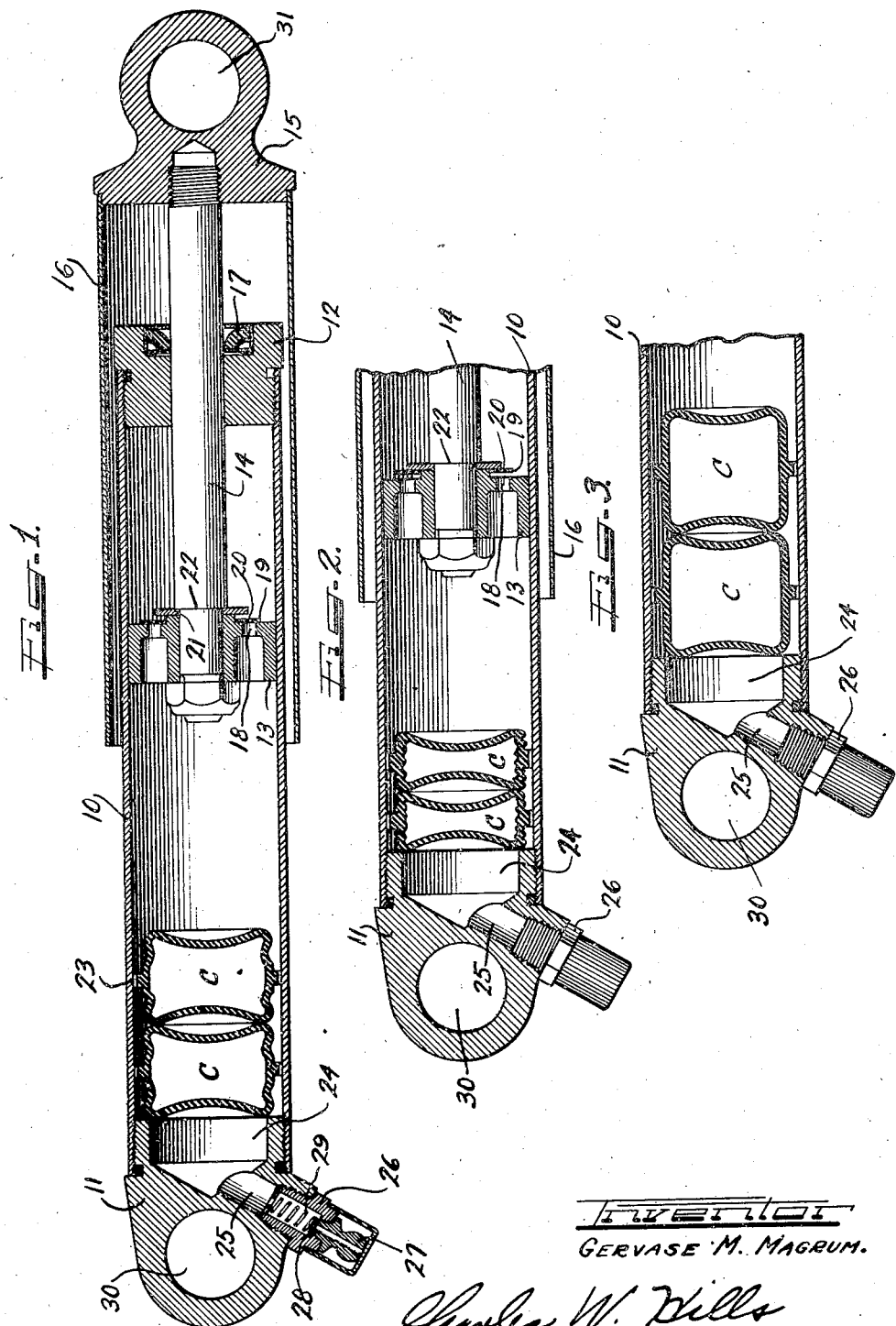
Inventor
GERVASE M. MAGRUM.
by Charles W. Hills
Attys.

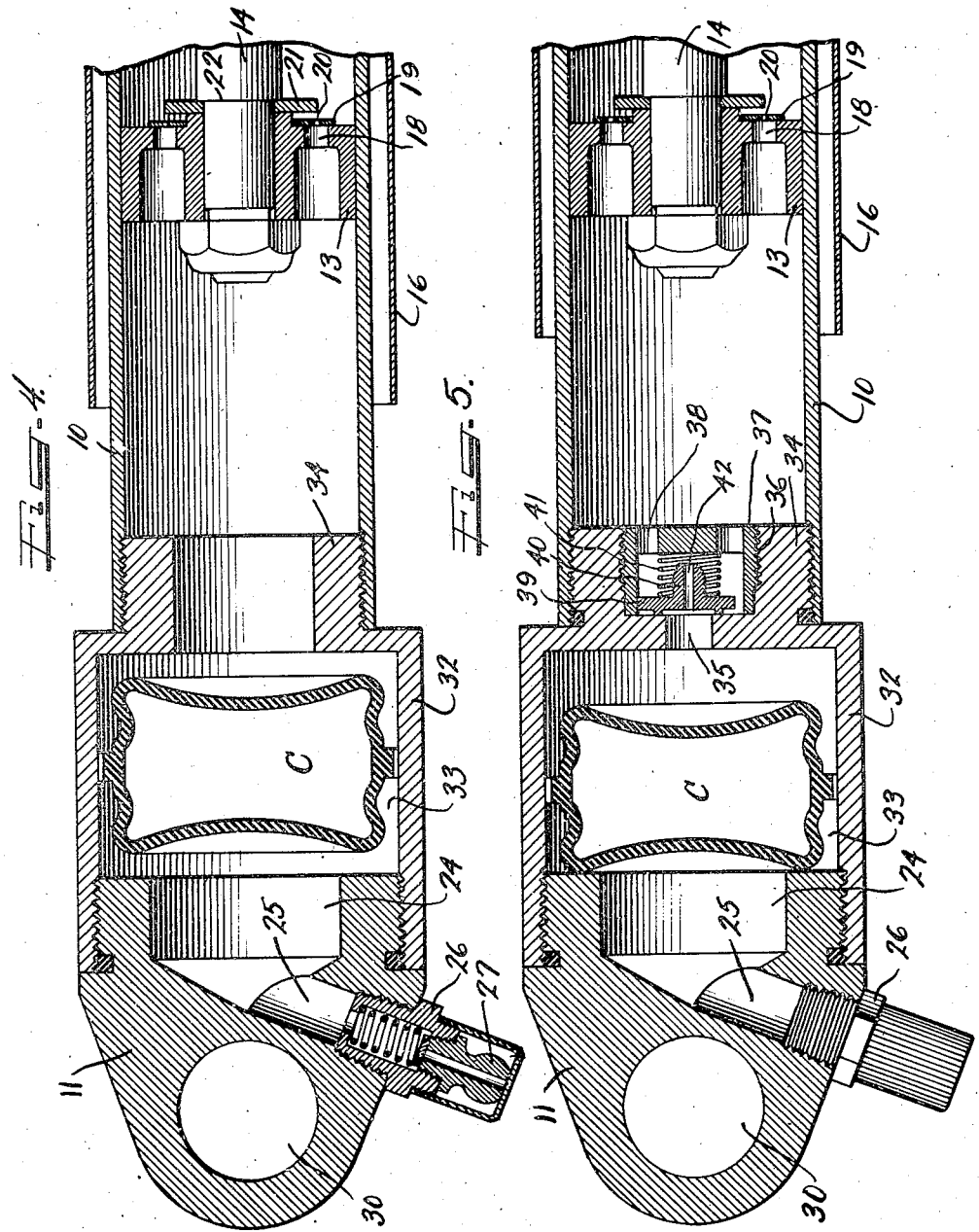

Oct. 29, 1946.　　　G. M. MAGRUM　　　2,410,176
SHOCK ABSORBER
Filed Oct. 7, 1943　　　3 Sheets-Sheet 3
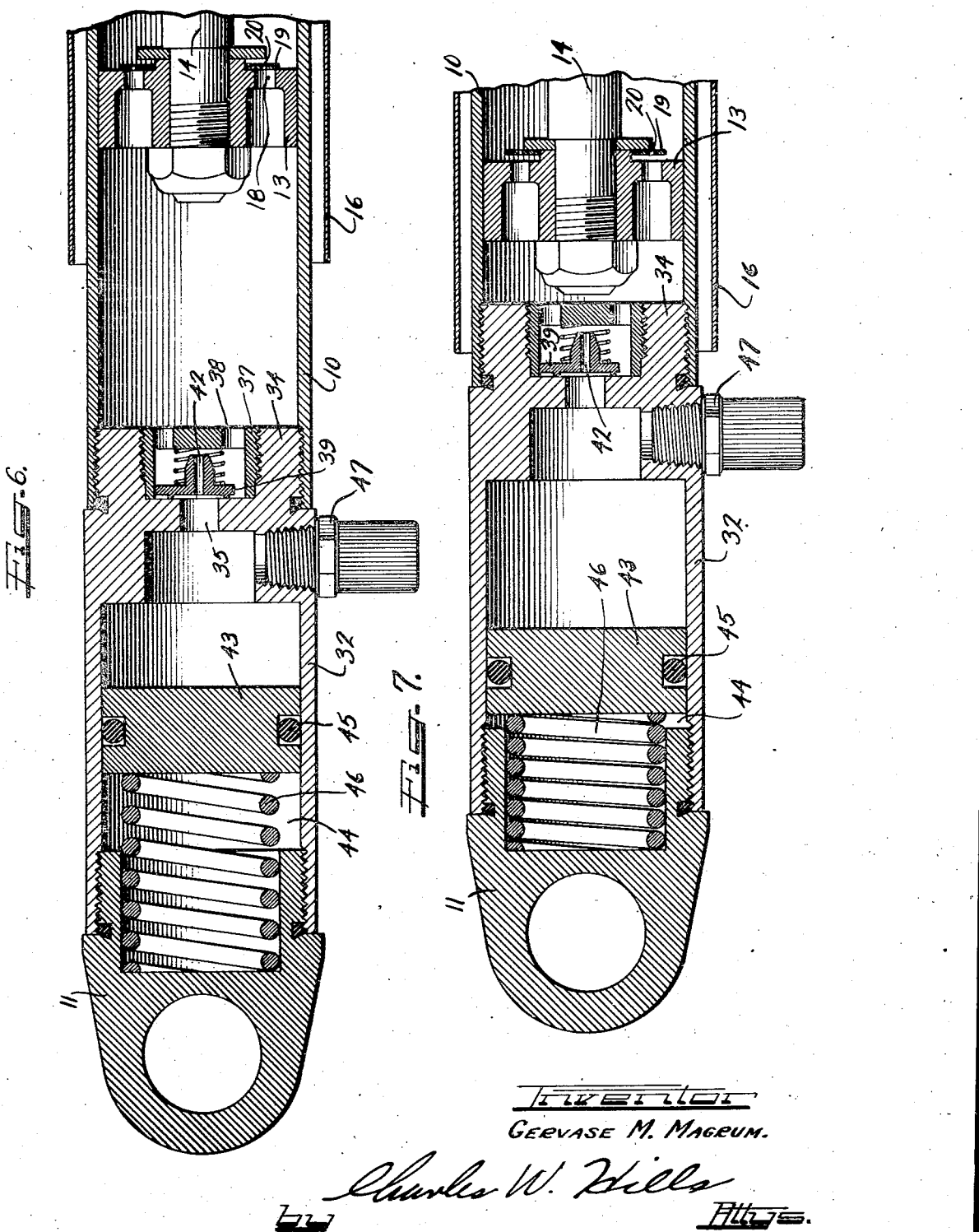
Inventor
GERVASE M. MAGRUM.

Patented Oct. 29, 1946

2,410,176

UNITED STATES PATENT OFFICE 2,410,176

SHOCK ABSORBER

Gervase M. Magrum, Buffalo, N. Y., assignor to Houdaille-Hershey Corporation, Detroit, Mich., a corporation of Michigan Application October 7, 1943, Serial No. 505,286

3 Claims. (Cl. 188—88)

This invention relates to hydraulic shock absorbers, particularly to the direct action type in which a cylinder structure and a piston structure are relatively reciprocable longitudinally for displacement of fluid against flow resistance. In the use of such shock absorbers, as for example for damping purposes in airplane landing gears or on guns for dampening the recoil, efficient operation of the shock absorber requires that the space in which the piston operates be at all times kept filled with hydraulic fluid to the exclusion of air, and compensating means should be provided to compensate for increase or decrease of the volume of the fluid due to temperature changes and also to compensate for displacement of hydraulic fluid by the volume of the piston rod as it enters or leaves the cylinder.

It is the object of my invention to provide an improved structure and arrangement for compensating for fluid volume variation due to temperature variation and for volume displacement by the piston rod in order that the cylinder space in which the piston operates may at all times be kept fully replenished and filled with hydraulic fluid.

More in detail, an important object is to provide within the shock absorber an expansible and contractible enclosure for medium such as air, which enclosure is subjected to the pressure of the displaced hydraulic fluid and functions to counteract such pressure in order to keep filled at all times the space within which the piston operates.

Another object of my invention is to provide for filling of hydraulic fluid into the cylinder under sufficient pressure to reduce the volume of the compensating structure an amount equal to the reduction in volume of fluid under the maximum temperature differential anticipated in order that, under temperature variation and increase or decrease of the fluid volume in the cylinder, the compensator structure may contract or expand correspondingly to effect compensation and keep the cylinder fully filled.

The various features of my invention are embodied in the structure shown on the drawings, in which:

Figure 1 is a longitudinal diametral section of a shock absorber showing the condition of the compensating means when the piston is in an intermediate position;

Figure 2 is a similar section showing the condition of the compensating structure when the piston is at the inner end of its stroke;

Figure 3 is a similar section showing the condition of the compensating structure after filling of hydraulic fluid under initial pressure into the cylinder while the piston is at the outer end of its stroke;

Figure 4 is a longitudinal diametral section of one end of a shock absorber showing a modified arrangement for the compensating structure and its condition when the piston is at an intermediate position in the cylinder;

Figure 5 is a view similar to Figure 4 showing a modified valving arrangement for control of displaced hydraulic fluid;

Figure 6 is a longitudinal diametral section of one end of a shock absorber showing a modified form of compensating structure and the condition of such structure when the piston is at an intermediate point in the cylinder; and Figure 7 is a view similar to Figure 6 showing the condition of the compensating structure the piston is at the inner end of its stroke.

In the structure on Figures 1 to 3, the cylinder 10 is in the form of a length of metal tubing closed at its ends by outer and inner heads 11 and 12 respectively, these heads being secured to the cylinder by screw threading into the respective ends thereof.

The piston 13 within the cylinder has the rod 14 extending therefrom through the head 12 and is secured at its outer end to a connector fitting 15, a protecting skirt 16 extending from the fitting to surround the cylinder 10. The cylinder head 12 supports suitable oil seal or packing means 17 for preventing leakage from the cylinder 10 to the exterior.

The piston 13 has ports 18 therethrough controlled by a valve disk 19 which has metering orifices 20 in alignment with the ports and which is axially shiftable on the piston rod between the piston and an abutment washer 21 engaging the shoulder 22 on the piston rod.

In the outer end of the cylinder 10 are located one or more compensator structures C. The compensating structures are in the form of enclosures having relatively movable walls and filled with medium such as air. In Figures 1 to 3, the compensating structures are in the form of enclosures or containers of expansible and contractible material, as, for example, rubber or other material having the characteristics of rubber, the containers being of generally cylindrical shape and provided with surrounding flanges 23 for engagement with the cylinder wall to hold the structures in alignment.

The cylinder head 11 has the bore 24 in its inner side communicating with an inlet passageway 25 in which is seated a valve plug 26 terminating in a nipple 27 for connection with a pump for charging hydraulic fluid into the cylinder, a check valve 28 engaged by a spring 29 permitting inflow but checking outflow. When the shock absorber is to be conditioned for service, the piston is moved to its outermost position and hydraulic fluid is forced in through the nipple under pressure sufficient to effect an initial reduction in volume of the compensator structures C and the air therein an amount equal to the reduction in volume of fluid under the maximum temperature differential anticipated during service of the shock absorber so that, under temperature variation and increase or decrease of the fluid volume in the cylinder, the compensator structure may contract or expand correspondingly to effect compensation and keep the cylinder fully filled. Figure 3 shows the initial contraction of the compensator structures.

The shock absorber is installed for service between two relatively movable structures to be controlled, the openings 30 and 31 in the head 11 and fitting 15 respectively providing means for attaching the head and the fitting respectively to the relatively movable structures to be controlled. Figure 1 shows the piston having been moved into an intermediate position, such inward movement having been comparatively free as the valve disk 19 was moved away from the ports 18 for comparatively free flow of the hydraulic fluid from the outer end of the cylinder to the inner end thereof. Upon such inward movement of the piston, corresponding inward movement of the piston rod 14 displaces a corresponding volume of fluid resulting in corresponding contraction of the compensator structures C by the fluid pressure, Figure 2 showing the piston having moved in the full distance for further contraction of the compensating structures. The expansion tendency of the compensating structures counteracts the contracting pressure and the cylinder is thus kept filled with fluid. Upon outward or rebound movement of the piston, the valve disk will be closed and only the orifices 20 will be available for flow of fluid from the inner end of the cylinder to the outer end thereof, and as the piston rod withdraws its volume from the cylinder, the compensator structures C will expand and compensate for this decreasing volume so that the cylinder will be kept filled with oil during the outward movement of the piston.

As a result of the initial compression and contraction of the compensator structures when the fluid under pressure is charged into the cylinder, the compensator structures may expand to keep the cylinder filled with fluid while the temperature decreases within the temperature differential anticipated, and under increasing temperature the compensator structures will be further compressed and contracted so that compensation will be efficiently performed within the predetermined temperature range and at the same time the displacement by the piston rod of the fluid in the cylinder will be compensated for.

The arrangement shown on Figure 4 is substantially the same as that shown on Figures 1 to 3 except that between the head 11 and the cylinder 10 a cylindrical housing 32 is interposed to provide the chamber 33. The head 11 threads into the outer end of the housing 32 and the housing has the annular threaded neck 34 threading into the outer end of the cylinder 10. Within the chamber 33 is the compensator structure C, the head 11 having the valve nipple structure 26 applied thereto for charging of hydraulic fluid under pressure into the chamber 33 and the cylinder 10 when the piston is at the outer end of its stroke. As the piston now moves in and out during service of the shock absorber, the compensator structure will function to correspondingly contract and expand to compensate for volume displacement by the piston rod 14 and also to compensate for volume variation due to temperature changes. When the piston moves inwardly during compression or bound operation of the shock absorber, the valve disk 19 will be open for comparatively free flow through the piston ports 18, while, when the piston moves outwardly during rebound operation, the valve disk will close to restrict the flow through the orifices 20 for corresponding retardation or shock absorption during such rebound operation.

The arrangement shown on Figure 5 is the same as that shown on Figure 4 except that a replenishing valve is interposed between the space in the working cylinder 10 and the chamber 33 in the housing 32. The inner wall of the housing 32 has the passageway 35 in communication with the threaded recess 36 in the neck 34 of the housing. This threaded recess receives the cup-shaped valve housing 37 having ports 38 in its bottom wall. Within the housing is the valve disk 39 having the neck 40 extending inwardly therefrom, a spring 41 encircling this neck and abutting the valve disk and the bottom of the housing tending to hold the valve seated against the inner wall of the housing 32 to cover the passageway 35. The valve disk and neck has the flow orifice 42 therethrough. When the piston 13 moves inwardly under compression or bound operation of the shock absorber, the valve disk 19 will be open for comparatively free flow from the inner end of the cylinder 10 to the outer end thereof, the fluid displaced in the outer end of the cylinder by the incoming piston rod 14 flowing through the ports 18 into the inner end of the cylinder, the resulting pressure against the valve disk 39 holding it closed so that the fluid must flow through the more or less restricted orifice 42 into the chamber 33 for contraction of the compensator structure C. Upon outward movement of the piston under rebound operation of the shock absorber, the valve disk 19 will close to restrict the fluid flow to the orifices 20 and, as the piston rod is being withdrawn from the outer end of the cylinder 10, the compensating structure C will expand and cause the fluid in the chamber 33 to exert pressure against the valve disk 39 for opening thereof for exposure of the passageway 35 for comparatively free flow of fluid from the chamber 33 into the inner end of the cylinder 10 and through the orifices 20 to compensate for the withdrawal of the piston rod.

Figures 6 and 7 embody the structure of Figure 5 except that a modified compensator structure is used. Like in Figure 5, the structure on Figure 6 embodies a cylinder housing 32 secured by its neck 34 to the cylinder 10 and threaded at its outer end to the head 11, the neck 34, like in the structure of Figure 5, supporting the valve 39. Instead of flexible wall compensators for containing air, like in Figures 1 to 5, in the arrangement of Figure 6 a compensator piston 43 is movable within the cylinder housing 32 defining with the cylinder wall and the head 11 the air chamber 44. The piston 43 is provided with packing 45 so that the chamber 44 is always closed to contain only air. A spring 46 in the air chamber 44 resists outward movement of the piston 43 and tends to shift it inwardly. A valved nipple plug 47 is applied to the compensating cylinder housing 32 to communicate with the inner end thereof. When the shock absorber is to be conditioned for service, hydraulic fluid is charged in through the plug 47 while the main piston 13 is at the outer end of the cylinder 10, the compensating piston 43 being shifted outwardly by the oil pressure against resistance of the spring 46 for an initial compression of the air in the air chamber 44.

Figure 6 shows the main piston 13 at substantially the middle of the cylinder 10 with the compensator piston 43 at substantially the middle of the cylinder 32. Now as the piston 13 moves inwardly or outwardly during service operation of the shock absorber the compensator piston 43 will follow. During the compression or bound stroke of the piston 13 and movement of the piston rod 14 into the cylinder 10, the displaced fluid will flow through the orifice 42 of the valve 39 into the compensating cylinder 32 to shift the compensator 43 outwardly to compensate for such displacement. During the rebound operation of the shock absorber the piston 13 moves outwardly to withdraw the piston rod and the expanding air in the chamber 44, assisted by the spring 46, will shift the piston 43 out to effect compensation for the withdrawal of the piston rod from the cylinder 10. Figure 7 shows the piston 13 at the inner end of the stroke and the corresponding position of the compensator piston 43 near the outer end of the cylinder housing 32.

In addition to compensation for movement of the piston rod into and out of the cylinder 10, the compensator structure will compensate for variation in volume of the hydraulic fluid due to temperature changes. The shock absorber hydraulic cylinder 10 in which the shock absorber piston 13 operates will therefore at all times be kept fully filled by the pressure exerted against the fluid at all times by the compensator structure. The shock absorber will therefore function with maximum efficiency in service where there is a wide range of temperature variation, as for example in aircraft landing gear, or on aircraft guns for damping gun recoil.

I have shown practical and efficient embodiments of various features of my invention but I do not desire to be limited to the exact construction and arrangement shown and described as changes and modifications may be made without departing from the scope of the invention.

I claim as follows:

1. A direct action shock absorber comprising a cylinder, a piston movable in the cylinder and having a rod extending therefrom to the exterior from one end of the cylinder, a housing part extending from the other end of the cylinder, said housing part defining a chamber for communication with said cylinder for the interflow of hydraulic fluid, compensating structure in said chamber defining a closed space containing air, part of said compensating structure being movable in response to the pressure of fluid flowing into said chamber from said cylinder when the piston rod moves into the cylinder whereby the confined air is compressed and by its expanding tendency against the movable part of said compensating structure exerts pressure against the hydraulic fluid to keep the cylinder filled during outward movement of the piston and withdrawal of the piston rod from the cylinder, valve means on said piston adapted to function to permit comparatively free flow from one side of the piston to the other during inward movement of the piston and the rod but to restrict the flow when the piston and rod move outwardly, and valve means interposed between said cylinder and said chamber to function to resist flow from the cylinder into said chamber when the piston and piston rod move inwardly but to permit freer flow from the chamber into the cylinder when the piston and rod move outwardly whereby said valve means interposed between the cylinder and the chamber will control the resistance to inward movement of the piston and the valve means on the piston will control the resistance to outward movement thereof.

2. A direct action shock absorber comprising a cylinder, a piston movable in the cylinder and having a rod extending therefrom to the exterior from one end of the cylinder, means at the opposite end of the cylinder defining a chamber for communication with said cylinder for the interflow of hydraulic fluid, said cylinder and chamber being filled with hydraulic fluid, compensating structure within said chamber defining a closed space containing air, part of said compensating structure being movable in response to the pressure of fluid flowing into said chamber from said cylinder when the piston rod moves into the cylinder whereby the confined air is compressed and by its expansion tendency against the movable part of said compensating structure exerts pressure against the hydraulic fluid to keep the cylinder filled during outward movement of the piston and withdrawal of the piston rod from the cylinder, valve means on said piston for controlling the flow of fluid in said cylinder from one side of the piston to the other, and other valve means interposed between said cylinder and said chamber functioning to resist flow from the cylinder into said chamber when the piston and piston rod move inwardly but to permit freer flow from the chamber into the cylinder when the piston and rod move outwardly, said other valve means affording the sole flow connection between said chamber and said cylinder whereby said other valve means controls resistance to inward movement of the piston.

3. A direct acting shock absorber comprising a cylinder having outer and inner end walls, a piston movable in said cylinder and having a rod extending therefrom to the exterior through said outer end wall, means associated with said inner end wall defining therewith a chamber for communication with said cylinder for the interflow of hydraulic fluid, compensating structure in said chamber defining a closed space containing air, part of said compensating structure being movable in response to the pressure of fluid displaced into said chamber from the cylinder when the piston rod moves into the cylinder whereby the confined air is compressed and by its expanding tendency against the movable part of said compensating structure exerts pressure against the hydraulic fluid to keep the cylinder filled during outward movement of the piston and withdrawal of the piston rod, valve means on said piston controlling the flow from one side of the piston to the other during movement of the piston and the rod in the cylinder, and valve means in said inner end wall functioning to restrict the flow from the cylinder into said chamber when the piston and piston rod move inwardly but to permit freer return flow from said chamber when the piston and rod move outwardly, said chamber except for said inner end wall valve means being closed against flow communication with said cylinder whereby said valve means in said inner wall controls resistance to inward movement of the piston.

GERVASE M. MAGRUM.